(12) United States Patent
Balepin et al.

(10) Patent No.: US 11,549,465 B1
(45) Date of Patent: Jan. 10, 2023

(54) AIR BREATHING SOLID FUEL ROTATING DETONATION ENGINE

(71) Applicant: Innoveering, LLC, Bohemia, NY (US)

(72) Inventors: Vladimir Balepin, Manorville, NY (US); Dean P. Modroukas, Scarsdale, NY (US); Patrick M. Drennan, Babylon, NY (US); William Henderson, Plainview, NY (US); Fabian Chacon, Ronkonkoma, NY (US)

(73) Assignee: INNOVEERING, LLC, Ronkonkoma, NY (US)

( * ) Notice: Subject to any disclaimer, the term of this patent is extended or adjusted under 35 U.S.C. 154(b) by 0 days.

(21) Appl. No.: 17/339,208

(22) Filed: Jun. 4, 2021

Related U.S. Application Data

(60) Provisional application No. 63/036,634, filed on Jun. 9, 2020.

(51) Int. Cl.
| | |
|---|---|
| *F23R 7/00* | (2006.01) |
| *F02K 7/10* | (2006.01) |
| *F23R 5/00* | (2006.01) |
| *F02K 7/18* | (2006.01) |
| *F02K 9/66* | (2006.01) |
| *F02K 7/02* | (2006.01) |

(52) U.S. Cl.
CPC ............ *F02K 7/105* (2013.01); *F02K 7/02* (2013.01); *F02K 7/18* (2013.01); *F02K 9/66* (2013.01); *F23R 5/00* (2013.01); *F23R 7/00* (2013.01)

(58) Field of Classification Search
CPC ... F02C 3/28; F02K 7/105; F02K 7/18; F02K 9/66
See application file for complete search history.

(56) References Cited

U.S. PATENT DOCUMENTS

| | | | |
|---|---|---|---|
| 3,240,010 A * | 3/1966 | Morrison | F02K 9/66 60/213 |
| 3,595,020 A * | 7/1971 | Schubert | F02K 9/72 60/209 |
| 4,502,649 A | 3/1985 | Botwin et al. | |

(Continued)

OTHER PUBLICATIONS

Manabu Hishida, Toshi Fujiwara, PiotrWolanski, "Fundamentals of rotating detonations", Feb. 10, 2009, ShockWaves (2009) 19:1-10, pp. 1-10. (Year: 2009).*

(Continued)

*Primary Examiner* — Todd E Manahan
*Assistant Examiner* — Marc J Amar
(74) *Attorney, Agent, or Firm* — Carter, DeLuca & Farrell LLP; George Likourezos; Jason B. Scher

(57) ABSTRACT

A solid fuel propulsion system includes a housing, an air inlet configured to enable air to flow into the housing, an air duct, a rotation detonation chamber, and a nozzle assembly. The air duct is disposed in the housing and is in fluid communication with the air inlet. The air duct is configured to supply air for combustion of a solid fuel configured to sublimate into a gaseous fuel mixture. The rotation detonation chamber is disposed in the housing aft of the air duct and is configured to combust the gaseous fuel mixture and air to generate a rotating detonation wave. The nozzle assembly is configured to expand and exhaust the flow prompted by the rotating detonation wave to generate thrust.

20 Claims, 10 Drawing Sheets

(56) References Cited

U.S. PATENT DOCUMENTS

| | | | | |
|---|---|---|---|---|
| 8,544,280 | B2* | 10/2013 | Lu | F02K 7/08 |
| | | | | 431/1 |
| 9,487,310 | B2* | 11/2016 | Soulier | F02K 9/766 |
| 9,556,794 | B2* | 1/2017 | Falempin | F02C 7/22 |
| 2005/0284127 | A1* | 12/2005 | Tobita | F02K 7/00 |
| | | | | 60/247 |
| 2007/0229609 | A1* | 10/2007 | Kim | B41J 2/1404 |
| | | | | 347/84 |
| 2010/0050592 | A1* | 3/2010 | Lu | F02K 7/08 |
| | | | | 60/39.38 |
| 2018/0080412 | A1 | 3/2018 | Mizener et al. | |
| 2021/0317789 | A1* | 10/2021 | Jacob | F23R 3/28 |
| 2021/0372324 | A1* | 12/2021 | Slabaugh | F02C 5/10 |

OTHER PUBLICATIONS

Eric M. Braun, Frank K. Lua, Donald R. Wilson a, José A. Camberos, "Airbreathing rotating detonation wave engine cycle analysis", Aug. 29, 2012, Aerospace Science and Technology 27 (2013) 201-208, pp. 201-208. (Year: 2012).*

Jiun-Ming Li\, Chiang Juay Teo, Boo Cheong Khoo, Jian-Ping Wang, Cheng Wang, Detonation Control for Propulsion, 2018, Springer, pp. 109-141. (Year: 2018).*

Lu et al., "Rotating Detonation Wave Propulsion: Experimental Challenges, Modeling, and Engine Concepts," AIAA 2011-6043 (20 pages).

Frolov et al., "Kerosene-Fueled Turbojet Afterburner Operating On Detonative Combustion, Recent Progress In Detonation For Propulsion," TORUS Press, 2019 (4 pages).

\* cited by examiner

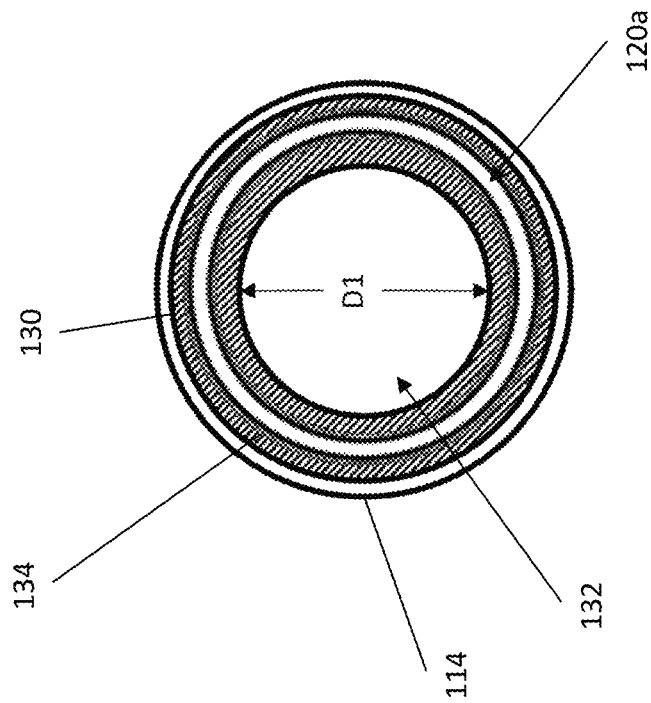
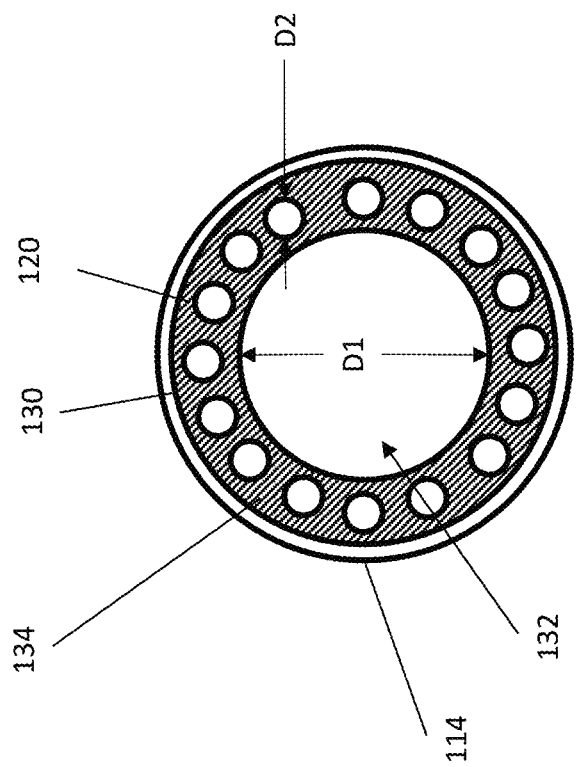
FIG. 1C
FIG. 1B

AIR BREATHING SOLID FUEL ROTATING DETONATION ENGINE

CROSS-REFERENCE TO RELATED APPLICATIONS

This application claims the benefit of U.S. Provisional Patent Application No. 63/036,634, filed on Jun. 9, 2020, entitled "AIR BREATHING SOLID FUEL ROTATING DETONATION ENGINE," the entire contents of which are incorporated herein by reference.

BACKGROUND

As conventional missile and propulsion systems become mainstream across the world, new missile and propulsion systems capable of countering conventional systems are desired. One such system includes air-breathing propulsion systems for high-speed, long-range missiles and/or projectiles. Air-breathing propulsion systems provide armed forces quick access to a target, extended range to permit large stand-off distances for mission safety and unanticipated responses, and superior propulsion system performance benefits over conventional rocket propulsion missile systems. Many high-speed air-breathing propulsion systems are based on liquid fuel ramjet (LFRJ) and solid fuel ramjet (SFRJ) propulsion systems.

LFRJ systems are complex and may pose safety and reliability issues due to their complexity and the liquid fuels used, but SFRJ propulsion systems offer advantages over LFRJ propulsion systems. In particular, SFRJ propulsion systems are reliable, easily storable, and less complex. A solid-fuel combustion cycle of an SFRJ is similar to a liquid-fueled combustion cycle of an LFRJ except that the fuel exists in solid form within the detonation chamber and the combustion is controlled by the regression rate (sublimation) of the solid fuel. SFRJ, such as that disclosed in U.S. Pat. No. 4,502,649 issued to Botwin, et. al., on Mar. 5, 1985, generally include an air inlet, a solid fuel grain, and a convergent/divergent (CD) nozzle. Atmospheric air is captured or supplied to the combustor via the air inlet. The air passes to the fuel grain where the fuel sublimates and forms a combustible mixture with the air. The combustible mixture is burned in the combustor and the resultant product passes towards the CD nozzle where it is exhausted, thereby generating thrust.

By comparison, rotating detonation engines (RDEs) take advantage of the inherent energy and thermodynamic properties and efficiency of a shockwave. RDEs include an annular detonation chamber closed at one end and open at the opposite end. A liquid fuel and an oxidizer are injected axially into the annular detonation chamber and ignited to begin a spinning detonation wave. The temperature and pressure increase across the spinning wave is generated by detonation and is intended to sustain and drive the spinning detonation wave circumferentially at supersonic speed. The reacted gas is then discharged continuously out the open end of the detonation chamber through the nozzle, thereby generating thrust. Due to features of the continuous RDE cycle, which is a constant volume combustion cycle, the specific impulse, which is a measure of thrust per unit flow consumption, can be increased by about 15% compared to the conventional propulsion cycles utilizing deflagration rather than detonation such as that utilized in SFRJ propulsion systems.

SUMMARY

The systems and methods of this disclosure provide solid fuel rotating detonation engine propulsion systems (SFRDE UNIT). SFRDE UNIT propulsion systems provides several advantages over solid-fueled ramjet systems (SFRJ), including improving the specific impulse by 15%. The detonation process of an SFRDE UNIT may also be initiated earlier (e.g., lower velocities or Mach numbers) than SFRJ, for example, at Mach 1.5 versus Mach 2.5. Since an SFRDE UNIT may be initiated at lower velocities or Mach numbers, the SFRDE UNIT is capable of producing moderately supersonic propulsion. SFRDE UNIT also provides a more compact combustion process via detonation versus deflagration in an SFRJ, and therefore better packaging to accommodate more payload or additional fuel. An SFRDE UNIT also eliminates need for flame-holding as combustion of fuel occurs across a detonation front which improves combustion efficiency versus SFRJ. When provided as a projectile, the SFRDE UNIT enables reduced acceleration loads, reduced gun or launcher wear, and a wider velocity operation range. The SFRDE UNIT leverages solid fuel-rich sources that sublimate or react to form hot gas that can be injected into a rotating detonation engine.

In accordance with aspects of this disclosure, a solid fuel propulsion system includes a housing, an air inlet configured to enable air to flow into the housing, an air duct, a rotation detonation chamber, and a nozzle assembly. The air duct is disposed in the housing and is in fluid communication with the air inlet. The air duct is configured to supply air for combustion of a solid fuel configured to sublimate into a gaseous fuel mixture. The rotation detonation chamber is disposed in the housing aft of the air duct and is configured to detonate the gaseous fuel mixture and air to generate a rotating detonation wave. The nozzle assembly is configured to expand and exhaust the flow prompted by the rotating detonation wave to generate thrust.

In further aspects, the air duct may be configured to enable air to flow through a passage defined by the solid fuel.

In further aspects, the air duct may enable air flowing therethrough to mix with the gaseous fuel mixture to form a fuel-rich gas. The fuel-rich gas may be urged into the rotation detonation chamber.

In yet other aspects, a restrictor may be disposed aft of the solid fuel. The restrictor may be configured to restrict backflow into the air duct.

In yet further aspects, the restrictor may be configured to enable length-distributed sublimation of the solid fuel along a length of the solid fuel.

In aspects, a shell may extend forward of the nozzle assembly and may be spaced apart from the housing. The shell may be configured to receive the solid fuel thereon.

In further aspects, the air duct may be defined by a space between the shell and the housing.

In aspects, an orifice plate may be disposed forward of the air duct. The orifice plate may be configured to direct a first portion of the air into the air duct and a second portion of the air into a bore of the shell to form a gaseous fuel mixture with the sublimated fuel.

In aspects, the bore may be configured to receive the solid fuel, the solid fuel including a solid fuel bore configured to enable the second portion of air to flow therethrough.

In other aspects, an upstream portion of the solid fuel may be burned to produce a first gaseous fuel mixture with the second portion of the air. The first gaseous fuel mixture may be configured to enable sublimation of a downstream portion of the solid fuel. The first gaseous fuel mixture may combine with sublimated solid fuel to form a second gaseous fuel mixture.

In aspects, a fuel injector may be configured to inject the gaseous fuel mixture into the rotation detonation chamber.

This disclosure also provides a solid fuel propulsion system including a housing having a housing shell disposed therein. The housing shell is spaced apart and coaxial with the housing to define an air duct therebetween. The housing shell is configured to receive a solid fuel. A gas generator is configured to produce a first gaseous fuel mixture from the mixture of the solid fuel and solid oxidizer, hereinafter "solid propellant." An air inlet is in fluid communication with the air duct. The air inlet is configured to enable air to flow into the housing to supply air for combustion of the gaseous fuel mixture. The solid fuel propulsion system includes a rotation detonation chamber disposed in the housing. The rotation detonation chamber is configured to combust the gaseous fuel mixture and air to generate a rotating detonation wave. A nozzle assembly is configured to expand and exhaust the flow prompted by rotating detonation wave to generate thrust.

In other aspects, the nozzle assembly may include a tapered end portion extending from the housing shell. The tapered end portion may define a convergent-divergent (CD) nozzle.

In aspects, the housing shell may be configured to prevent air flowing through the air duct from directly contacting the solid fuel.

In aspects, a fuel injector may be configured to inject the first gaseous fuel mixture into an aft portion of the air duct whereby air flowing through the air duct is configured to mix with the first gaseous fuel mixture to form a second gaseous fuel mixture.

In aspects, the housing shell may include a first shell portion configured to receive a first solid propellant and a second shell portion configured to receive a second solid fuel.

In further aspects, the gas generator may be disposed adjacent the first shell portion and may be configured to cause sublimation of the first solid propellant to form the first gaseous fuel mixture from the solid propellant. The first gaseous fuel mixture may be configured to cause sublimation of the second solid fuel in the second shell portion to form a second gaseous fuel mixture.

This disclosure also provides a method for generating propulsion. The method includes enabling air to flow into a solid fuel propulsion system via an inlet thereof. The method includes directing air to flow through an air duct in fluid communication with the inlet towards a detonation chamber of the solid fuel propulsion system. The method includes enabling a solid fuel to sublimate into a first gaseous fuel mixture and directing the first gaseous fuel mixture to flow to the detonation chamber. The method includes detonating the first gaseous fuel mixture and air in the detonation chamber to produce a rotating detonation wave. The method includes exhausting and expanding the flow resulting from rotating detonation to generate thrust.

In aspects, wherein directing air to flow through an air duct may include directing air to flow through a solid fuel defining the air duct whereby the air flowing therethrough mixes with sublimated solid fuel to form the first gaseous fuel mixture.

In aspects, the method may further include causing the solid propellant to sublimate into the first gaseous fuel mixture with a gas generator.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which:

FIG. 1B is a cross-sectional view of the solid fuel rotating detonation engine of FIG. 1A taken along line B-B in FIG. 1A, in accordance with aspects of this disclosure;

FIG. 1C is an alternative cross-sectional view of the solid fuel rotating detonation engine of FIG. 1A taken along line B-B on FIG. 1A, in accordance with aspects of this disclosure;

DETAILED DESCRIPTION

Figure 1A:
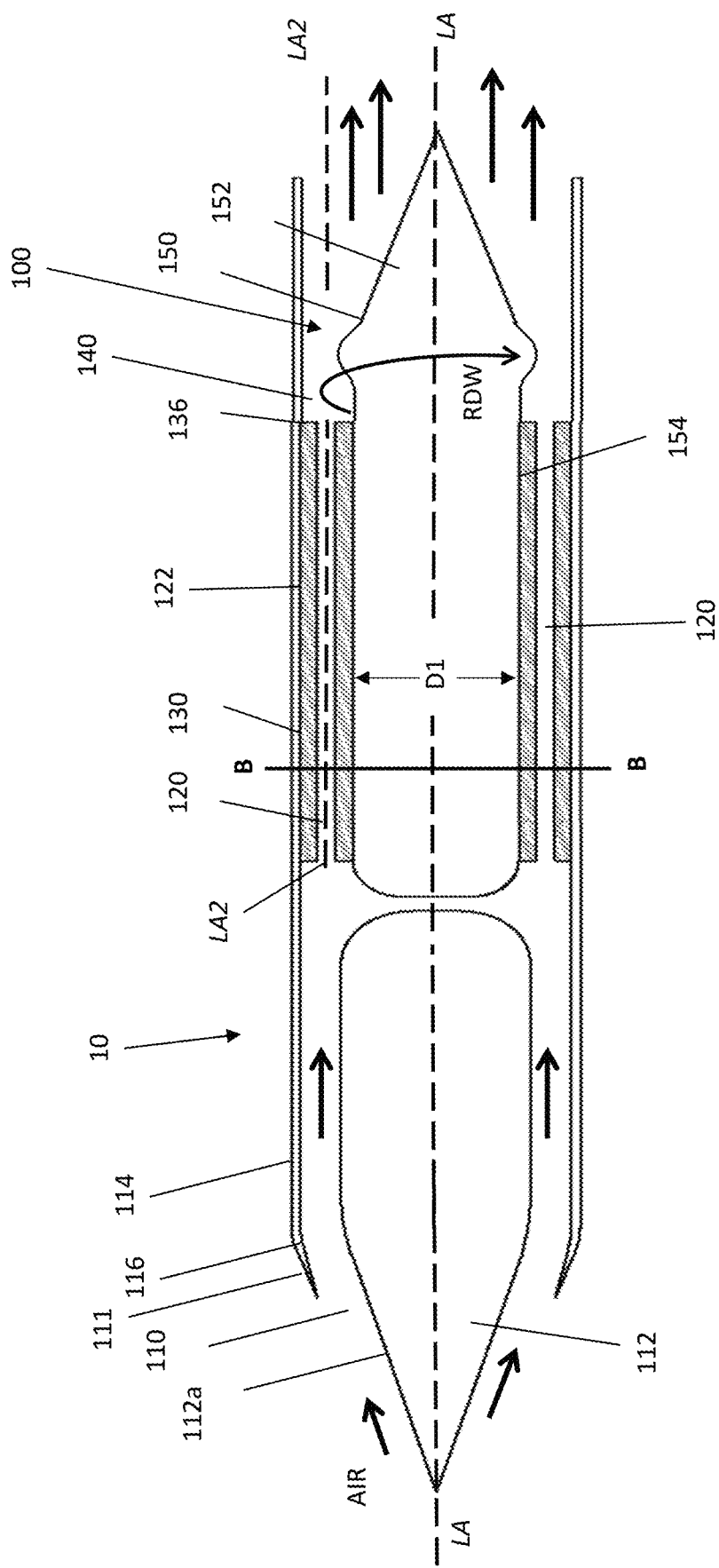
FIG. 1A is a diagram of a solid fuel rotating detonation engine including an end burner, in accordance with aspects of this disclosure.

Aspects of the presently disclosed solid fuel rotating detonation engine systems are described in detail with reference to the drawings, in which like reference numerals designate identical or corresponding elements in each of the several views.

Although this disclosure will be described in terms of specific aspects, it will be readily apparent to those skilled in this art that various modifications, rearrangements, and substitutions may be made without departing from the spirit of this disclosure.

As used herein, the term "forward" refers to an upstream portion of a solid fuel rotating detonation engine and the term "aft" refers to a downstream portion of the rotating detonation engine.

As used herein, the term "about" means that the numerical value is approximate and small variations would not significantly affect the practice of the disclosed aspects of this disclosure. Where a numerical limitation is used, unless indicated otherwise by the context, "about" means the numerical value can vary by ±15% and remain within the scope of the disclosed aspects of this disclosure.

With reference to FIGS. 1A-B, this disclosure provides a solid fuel rotating detonation engine-equipped airframe or aerial vehicle (SFRDE UNIT) 100 configured to utilize solid fuel and sublimation thereof for a combustion cycle in a rotating detonation engine. The SFRDE UNIT 100 is operatively disposed in an airframe 10, which may be, for example, a rocket, a projectile, or an aerial vehicle.

The SFRDE UNIT 100 includes an inlet 110, one or more air channels 120 in fluid communication with the inlet 110, a detonation chamber 140 configured to detonate sublimated solid fuel 130, and a nozzle assembly 150. The detonation chamber 140 is disposed at an aft portion of the SFRDE UNIT 100 and downstream of the solid fuel 130. The detonation chamber 140 may be configured as an end burner, and SFRDE UNIT 100 may be an end-burner SFRDE UNIT (EB SFRDE UNIT) 100. The detonation chamber 140 can be in the form of a rotating detonation engine and may be substantially annular. Nozzle assembly 150 is a convergent-divergent nozzle configured to enable exhaust gas expansion. In aspects, nozzle assembly 150 includes a tapered end portion 152 extending from a shell 154. In aspects, the shell 154 is centered in a housing 114. Housing 114 and shell 154 may share a common longitudinal axis LA. Tapered end portion 152 may have a conical or a concave parabolic conical configuration. In aspects, nozzle assembly 150 may include a bell nozzle.

Structural supports (not shown) may couple shell 154 to the housing 114 of the EB SFRDE UNIT 100 to centrally support shell 154 within housing 114. The housing 114 may have substantially cylindrical configuration and may include an aerodynamic structure such as a frustoconical tapered structure 111 on a leading or forward end thereof.

The solid fuel 130 may be cast as a hollow cylinder so as to define a bore 132 (FIG. 1B) having a diameter D1, and shell 154 may be inserted into and/or through the bore 132 of the solid fuel 130. In aspects, solid fuel 130 may be bars or rods (not shown) inserted between shell 154 and housing 114 and may be secured to surfaces of shell 154 and housing 114 so as to define air channels 120 through solid fuel 130. In aspects, solid fuel 130 may be in the form of bars or rods (not shown). In other aspects, the solid fuel 130 may be cast as nested rings so as to define an annular air channel 120a between portions thereof as illustrated in FIG. 1C.

The air channels 120 may be defined by or within the solid fuel 130 (FIG. 1B). For example, solid fuel 130 may be cast from a solid fuel grain 134 so as to define one or more air channels 120 therethrough. Indeed, solid fuel 130 may be cast as a cylinder (or any other suitable shape) having a hollow center configured to receive the nozzle 150 and the shell 154 therein, and the air channels 120 define one or more elongated passages in solid fuel 130, which may be cylindrical (or any other suitable shape). Indeed, the air channels 120 defined by elongated passages of the solid fuel 130 may have any desirable cross-sectional shape, such as a circle, star, rectangle, etc., or combinations thereof.

Solid fuel 130 is configured as any desirable solid fuel grain. In aspects, solid fuel 130 may have a cylindrical, uniform thickness fuel grain conforming to housing 114 of the EB SFRDE UNIT 100, although other shapes may be provided. In aspects, a width or a diameter D2 of the one or more air channels 120 may vary along a longitudinal axis of the air channels 120 so as to define variable cross-sectional shapes. By providing the one or more air channels 120 with variable cross-sectional shapes, sublimation and combustion of solid fuel 130 can be controlled as the surface area of the solid fuel 130 in contact with air flowing through the air channels 120 changes. As the surface area changes, more air flowing in air inlet 110 can oxidize and sublimate solid fuel 130. Thus, the rate of sublimation and/or oxidization may be controlled by providing variable cross-sectional shapes of the solid fuel 130. Solid fuel 130 may include any solid fuel grain and material known by those of ordinary skill in the art, such as hydroxyl-terminated polybutadiene (HTPB). The solid fuel 130 may include a fuel grain having any desirable patterns, thicknesses, lengths, holes, etc. depending on the required combustion time or characteristics of the EB SFRDE UNIT 100, including range, flight time, ignition speed, combustion time, etc.

Air is captured by the EB SFRDE UNIT 100 via inlet 110 and flows to air channels 120. The inlet 110 may be defined by a space between a tapered end portion 112a of a forward shell 112 and an inner wall 116 of housing 114 of the EB SFRDE UNIT 100. Forward shell 122 may be a forward extension of shell 154 or an independent structure of the airframe 10. In aspects, the inlet 110 is configured to compress atmospheric air.

The air that is supplied to the air channels 120 mixes with the solid fuel 130 as the solid fuel 130 sublimates and forms a fuel-rich combustible gas mixture. The air is an oxidizer that enables sublimation of the solid fuel 130, which mixes with the sublimated fuel to form a combustible gas mixture. The combustible gas mixture initiates the combustion and detonation process in the detonation chamber 140 and causes a rotating detonation wave. After the combustion process is initiated, the rotating detonation wave (RDW) interacts with an aft end 136 of the solid fuel 130 causing more intensive sublimation of the solid fuel 130 due to the high temperature and supersonic flow. This process supplies further sublimated fuel, and therefore combustible gas mixture, to the detonation chamber 140. After detonation and combustion of the combustible gas mixture in the detonation chamber 140, the resultant hot gas passes to the nozzle assembly 150 where it expands and thereby generates thrust. As the detonation process further consumes fuel, the aft end 136 of the solid fuel 130 moves upstream until a majority or all of the solid fuel 130 is consumed. The RDW defines a shockwave and helps mix and efficiently burn the combustible gas mixture to produce thrust. Further description of an RDW in a rotating detonation engine may be found in "Rotating Detonation Wave Propulsion: Experimental Challenges, Modeling, and Engine Concepts," by Lu et. al., AIAA 2011-6043), the entire contents of which are herein incorporated by reference.

Figure 2:
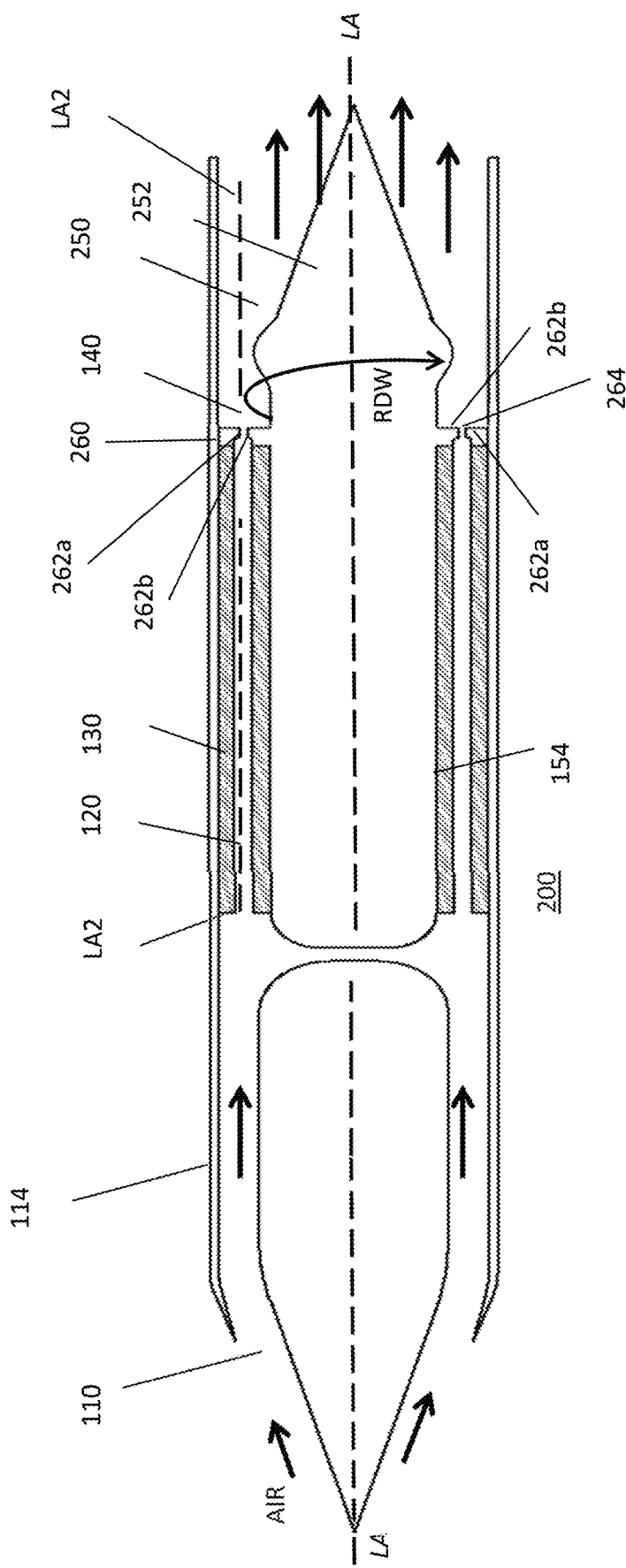
FIG. 2 is a diagram of a solid fuel rotating detonation engine including a restrictor adjacent to a combustor utilizing a length distributed sublimation of a solid fuel to supply the fuel to the combustor, in accordance with another aspect of this disclosure.

With reference to FIG. 2, in accordance with aspects of this disclosure, a length distributed sublimation SFRDE UNIT (LDS SFRDE UNIT) 200 is shown. LDS SFRDE UNIT 200 is similar to EB SFRDE UNIT. LDS SFRDE UNIT includes an inlet 110, one or more air channels 120, a solid fuel 130, a detonation chamber 140, and a nozzle assembly 150, each similarly configured to those of EB SFRDE UNIT 100.

LDS SFRDE UNIT 200 further includes a restrictor 260 configured to restrict backflow from detonation chamber 140 into air channels 120. Restrictor 260 may include first and second protrusions 262a, 262b that are spaced apart to define a restricted channel 264. The first and second protrusions 262a, 262b may be rectangular knubs or any suitable shape, (e.g., contoured knubs resembling a venturi tube, cylinders, etc.). The restricted channel 264 may have a longitudinal axis that is aligned with a longitudinal axis LA2 of the air channels 120 or may be offset from the longitudinal axis LA2 of the air channels 120. The first and second protrusions 262a, 262b, of the restrictor 260 may be rings coupled to the housing 114 and the shell 154, respectively.

Restrictor 260 causes higher pressure upstream of the restrictor 260, which enables solid fuel sublimation to be more evenly distributed along about the whole length of solid fuel 130 and air channels 120 (e.g., vs. EB SFRDE UNIT). The restrictor 260 prevents the RDW from moving upstream and thus prevents interaction with the aft end 136 of solid fuel 130, which may otherwise cause faster consumption of solid fuel 130 and undesirable interactions with air channels 120 and inlet 110.

Figure 3:
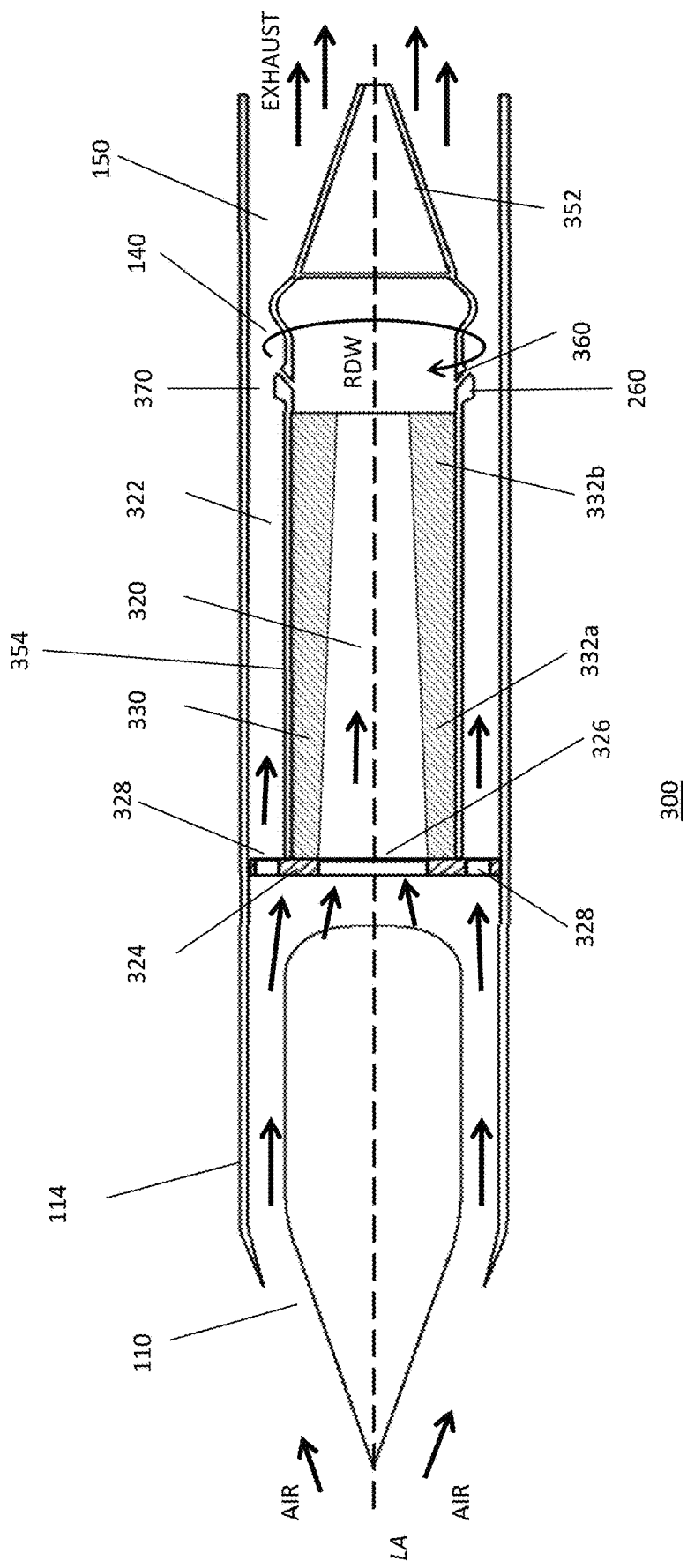
FIG. 3 is a diagram of a staged combustion solid fuel rotating detonation engine, in accordance with another aspect of this disclosure.

With reference to FIG. 3, in accordance with aspects of this disclosure, a staged combustion SFRDE UNIT (SC SFRDE UNIT) 300 is shown. SC SFRDE UNIT 300 utilizes precombustion and/or sublimation of solid fuel in a limited airflow to supply substantially fuel-rich gas to detonation chamber 140. SC SFRDE UNIT 300 includes inlet 110, a shell 354 further configured to support solid fuel 330, detonation chamber 140, and nozzle assembly 150 extending aft of shell 354. SC SFRDE UNIT 300 further includes a core duct 320, a bypass duct 322, an orifice plate 324, a fuel injector 360, and an air injector 370.

Air flows through inlet 110 towards orifice plate 324. The orifice plate 324 is positioned upstream of core duct 320 and bypass duct 322. Orifice plate 324 is configured to split the incoming airflow into core duct 320 and bypass duct 322 via a core orifice 326 and a bypass orifice 328, respectively. Orifice plate 324 is configured to direct a smaller portion of the airflow into core duct 320 and a larger portion of the airflow into bypass duct 322.

Core duct 320 is defined by an inner surface of solid fuel 330. In aspects, the solid fuel 330 may be cast as a cylindrical structure (although any other suitable shapes may be provided) that has a tapered hollow passage therethrough. In aspects, solid fuel 330 is formed as a separate structure disposed about a core duct 320 that is defined by SC SFRDE UNIT 300. For example, core duct 320 may be defined by a passage of shell 354. In core duct 320, the smaller portion of the airflow initially burns with solid fuel 330 to produce a first gas mixture that supports fuel sublimation in a downstream portion of core duct 320. Sublimated fuel in the downstream portion of core duct 320 further mixes with the first gas mixture to produce a substantially fuel-rich second gas mixture. In aspects, an igniter (not shown) initiates combustion at an upstream portion of solid fuel 330 such that the smaller portion of airflow may initially burn with solid fuel 330.

The second gas mixture is injected by fuel injector 360 into detonation chamber 140. Fuel injector 360 may include a group of orifices defined in shell 354. The fuel injector 360 may further be defined by restrictor 260, such that the protrusions (see e.g., first and second protrusions 262a, 262b of FIG. 2) guide the first or second gas mixture through the fuel injector 360 and into the detonation chamber 140. In SC SFRDE UNIT 300, the restrictor 260 is also configured as air injector 370 to regulate air flowing into detonation chamber 140. Air injector 370 supplies air from the larger portion of airflow in bypass duct 322 into detonation chamber 140. The second gas mixture combines with the supplied air and combusts in detonation chamber 140 to produce a final exhaust gas and rotating detonation wave (RDW). Thrust is generated as the RDW pushes the final exhaust gas over nozzle assembly 150 where the gas expands.

In aspects, solid fuel 330 may include a solid fuel section 332a that is thinner than a solid fuel section 332b (e.g., a tapered transition therebetween). Solid fuel sections 332a, 332b are configured such that core duct 320 defines a cone shape (although other suitable shapes may be provided) with a narrowing passageway.

Figure 4:
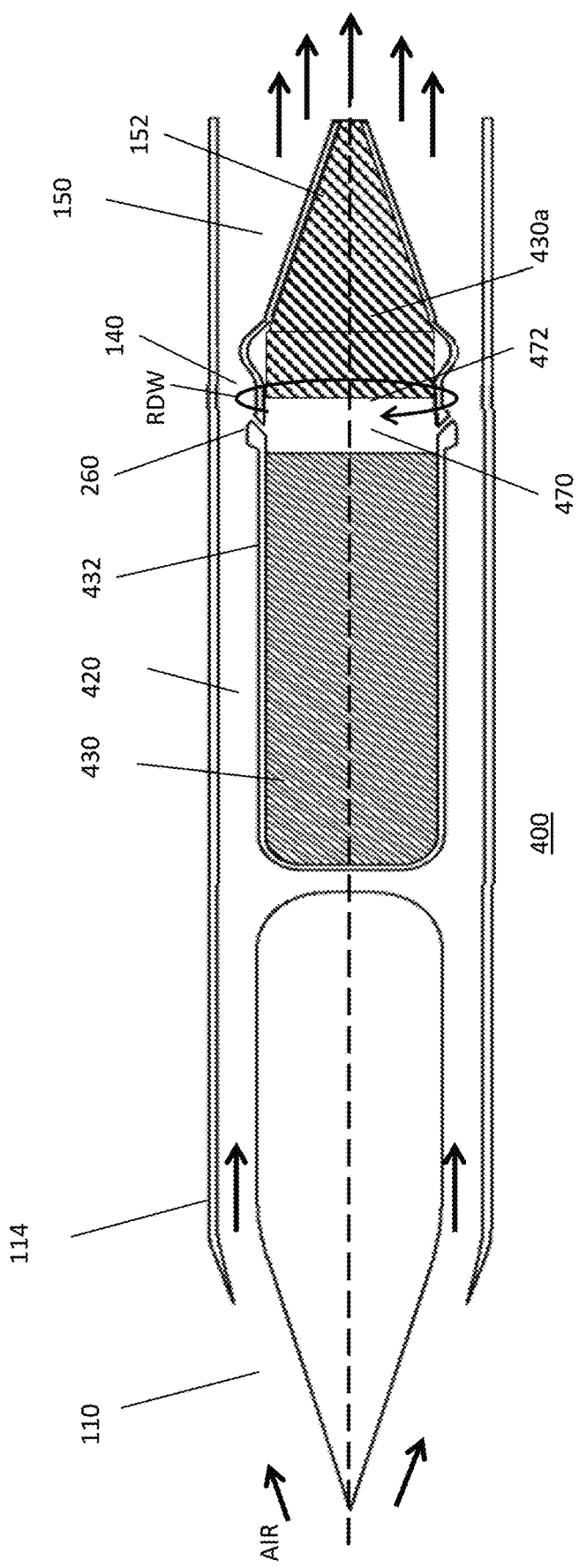
FIG. 4 is a diagram of a solid fuel rotating detonation engine employing a solid propellant gas generator, in accordance with another aspect of this disclosure.

With reference to FIG. 4, in another aspect of this disclosure, a gas generator SFRDE UNIT (GG SFRDE UNIT) 400 includes a solid propellant gas generator to supply gasified fuel into a RDE detonation chamber. Solid propellant 430 may comprise a mixture of the solid oxidizer and solid fuel, such as ammonium perchlorate (AP) and hydroxyl-terminated polybutadiene (HTPB) and GG SFRDE UNIT 400 includes an inlet 110, an air duct 420, a solid propellant shell 432 configured to support solid propellant 430, a gas generator 470, a detonation chamber 140, a nozzle assembly 150 including a tapered end portion 152, and a restrictor 260. Solid propellant shell 432 may be a forward extension of nozzle assembly 150. The air duct 420 is defined by a passage between solid propellant shell 432 and a housing 114 of GG SFRDE UNIT 400.

In aspects, an additional solid propellant 430a is disposed inside of the tapered end portion 152 and is open to the gas generator 470. In aspects, solid propellant 430a may include a different material than solid propellant 430.

Operation of GG SFRDE UNIT 400 is different than that of EB SFRDE UNIT 100, LDS SFRDE UNIT 200, and SC SFRDE UNIT 300 in that atmospheric air flowing into inlet 110 of GG SFRDE UNIT 400 does not come into direct contact with solid propellant 430. Solid propellant 430 is separated from air duct 420 by solid propellant shell 432. In aspects, the air flowing through air duct 420 may be separated from solid propellant 430 via any casing, member, or channel configured to prevent the air flowing in from directly contacting solid propellant 430.

Gas generator 470 includes an igniter (not shown) that initially burns solid propellant 430 causing reaction between mixed solid oxidizer and solid fuel. Solid propellant 430 includes solid oxidizer such as AP and solid fuel such as HTPB that are mixed at the ratio of, for example, approximately 1:1 resulting in a substantially fuel rich gas produced in gas generator 470. The fuel-rich gas mixture is injected from gas generator 470 into detonation chamber 140. The mixture ratio of the air and fuel-rich gas in detonation chamber 140 may vary and may have a wide range. The stoichiometric ratio may be approximately 6.5 (for the GG propellant composition AP/HTPB=1:1).

The restrictor 260 may be configured to restrict backflow from detonation chamber 140 that may otherwise be caused by the RDW.

Figure 5:
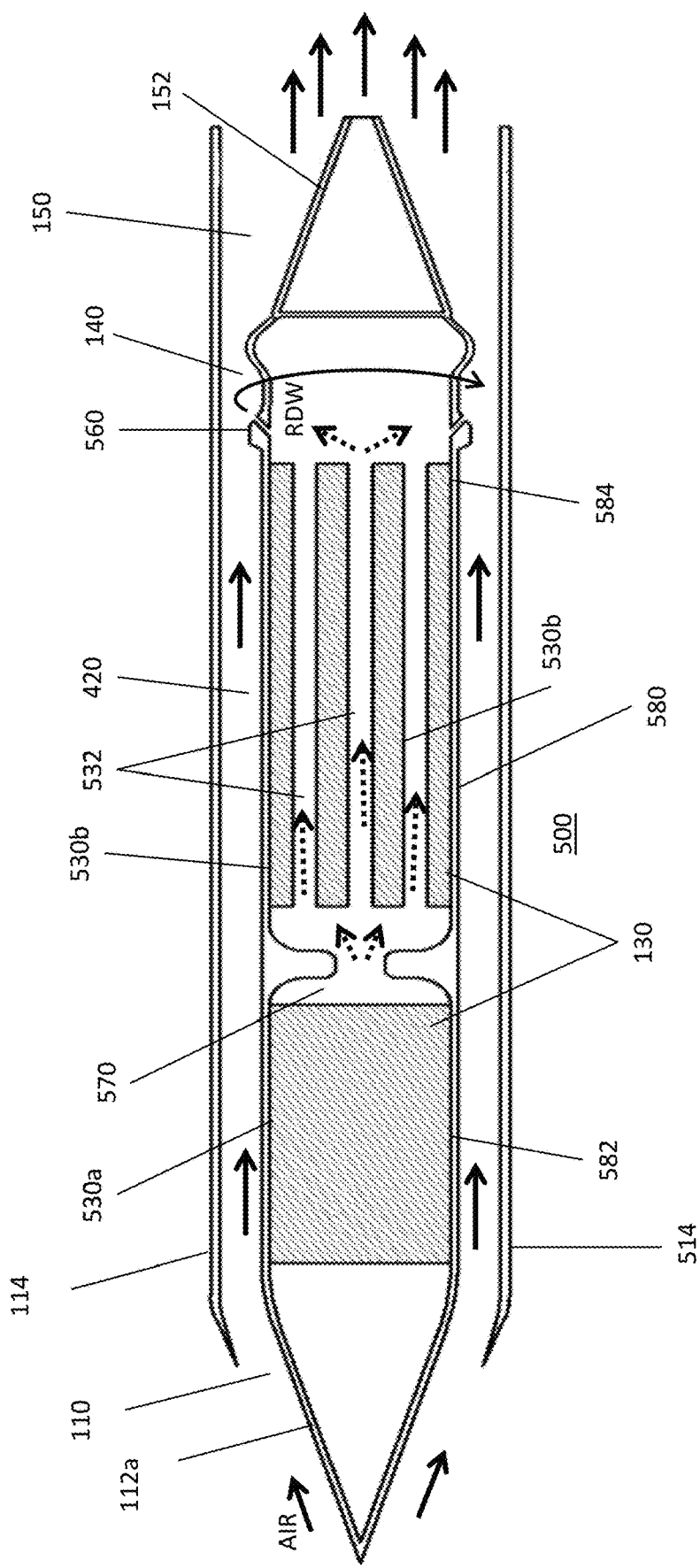
FIG. 5 is a diagram of a solid fuel rotating detonation engine employing a solid propellant gas generator supported by a length distributed sublimation of a solid fuel, in accordance with another aspect of this disclosure.

With reference to FIG. 5, in accordance with another aspect of this disclosure, a gas generator supported, length distributed sublimation SFRDE UNIT (GGS-LDS SFRDE UNIT) 500 utilizes a gas generator 570 to generate a fuel-rich gas from a solid propellant 530a that enables length distributed sublimation of a solid fuel 530b. GGS-LDS SFRDE UNIT 500 includes an inlet 110, an air duct 420, a housing shell 580 configured to store the source of gasified fuel, a detonation chamber 140, a nozzle assembly 150, a restrictor 260, and a gas generator 570.

The source of the gasified fuel used in the GGS-LDS SFRDE UNIT is provided as solid propellant 530a and solid fuel 530b. Similar to GG SFRDE UNIT, solid propellant 530a comprises a mixture of solid oxidizer and solid fuel (e.g., AP and HTPB at the ratio >1). Solid fuel 530b comprises solid fuel mixture (e.g., HTPB). Housing shell 580 includes a first housing section 582 configured to support solid propellant 530a and a second housing section 584 configured to support solid fuel 530b. In aspects, the first and second housing sections 582, 584, may be configured to resemble an hourglass shape with a narrow part thereof designed to support high pressure in gas generator 570 required for solid propellant combustion. Tapered end portion 152 of nozzle assembly 150 extends aft of second housing section 584 of housing shell 580. The forward tapered end portion 112a may be a forward extension of housing shell 580. In further aspects, first solid fuel 530a is disposed within the forward tapered end portion 112a and/or is disposed aft of tapered end portion 112a. The first solid fuel 530a is disposed forward of second solid fuel 530b.

Housing shell 580 is a cylindrical housing (although other shapes may be provided) disposed with the housing 114 of the GGS-LDS SFRDE UNIT 500. Housing shell 580 is configured to prevent air flowing into inlet 110 and through air duct 520 from directly contacting solid fuel 530a and/or solid fuel 530b. Housing shell 580 may extend over half a length of the housing 114, and, in aspects, may extend up to about 90% of the length of the housing 114. In aspects, housing shell 580 is centered with a longitudinal axis of housing 114 of the GGS-LDS SFRDE UNIT 500. The gas generator 570 is disposed in housing shell 580 adjacent first solid fuel 530a.

Similar to the GG SFRDE UNIT 400, air flowing into inlet 110 and through air duct 420 does not come into direct contact with solid propellant 530a or solid fuel 530b. The gas generator 570 causes the first solid propellant 530a to burn to form a first fuel-enriched gas mixture. In other aspects, the gas generator may be further configured to promote sublimation of the solid fuel 530b. The first enriched gas mixture flows over and/or through solid fuel 530b disposed aft of solid propellant 530a. Solid fuel 530b sublimates and combines with the first fuel-rich gas mixture to create a second fuel-rich gas mixture with a substantially higher fuel to oxidizer ratio versus the first fuel-rich gas mixture. The second fuel-rich gas mixture is injected into detonation chamber 140. The second fuel-rich gas mixture may further mix with air from air duct 520 upstream of detonation chamber 140.

Solid fuel 530b includes one or more gas channels 532 through which the first fuel enriched gas mixture flows. Gas channels 532 may be defined by solid fuel 530b when solid fuel 130 is cast, similar to air channels 120 of, for example, EB SFRDE UNIT 100. Alternatively, solid fuel 530b may be cast as multiple components and arranged in the GGS-LDS SFRDE UNIT 500 so as to define one or more gas channels 532. In aspects, solid fuel 530b defines an array of solid fuel including the gas channels 532.

Figure 6:
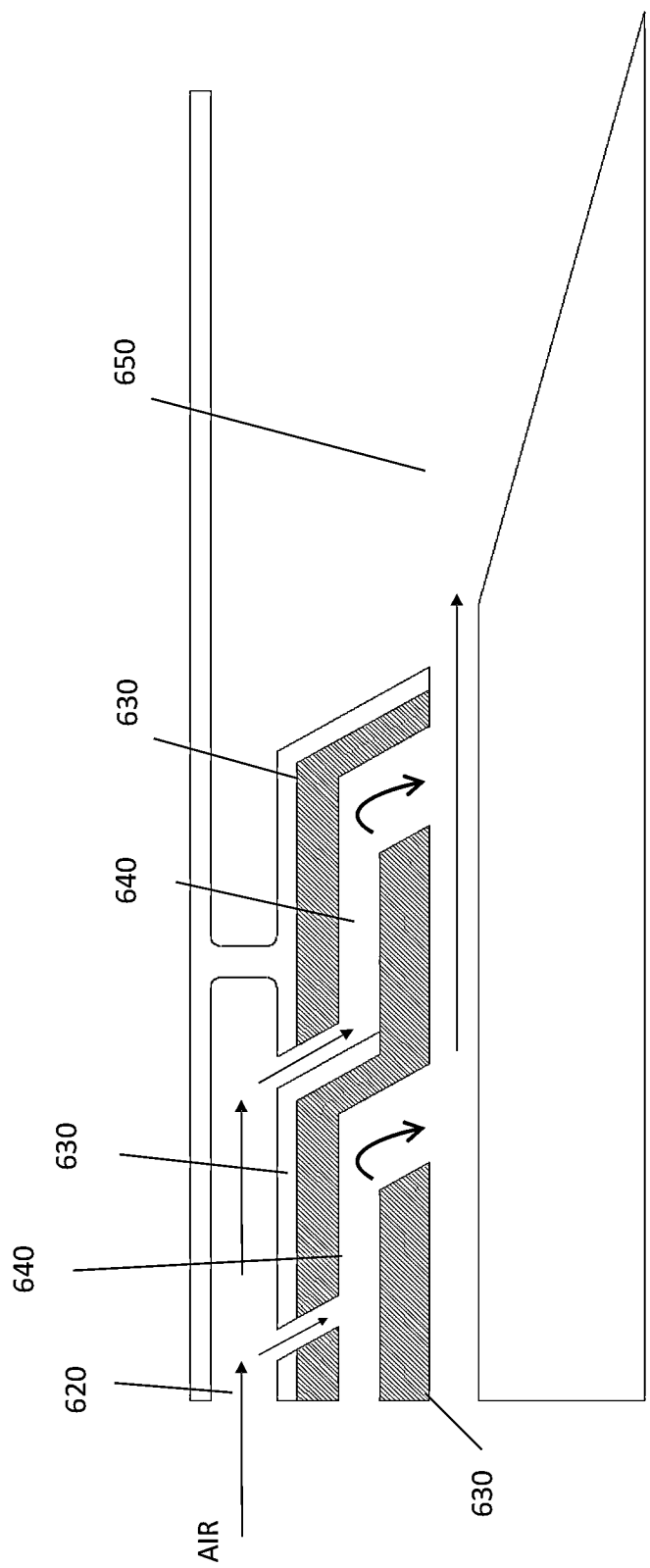
FIG. 6 is a diagram of a nested-multiple solid fuel rotating detonation engine system, in accordance with another aspect of this disclosure.
Figure 7:
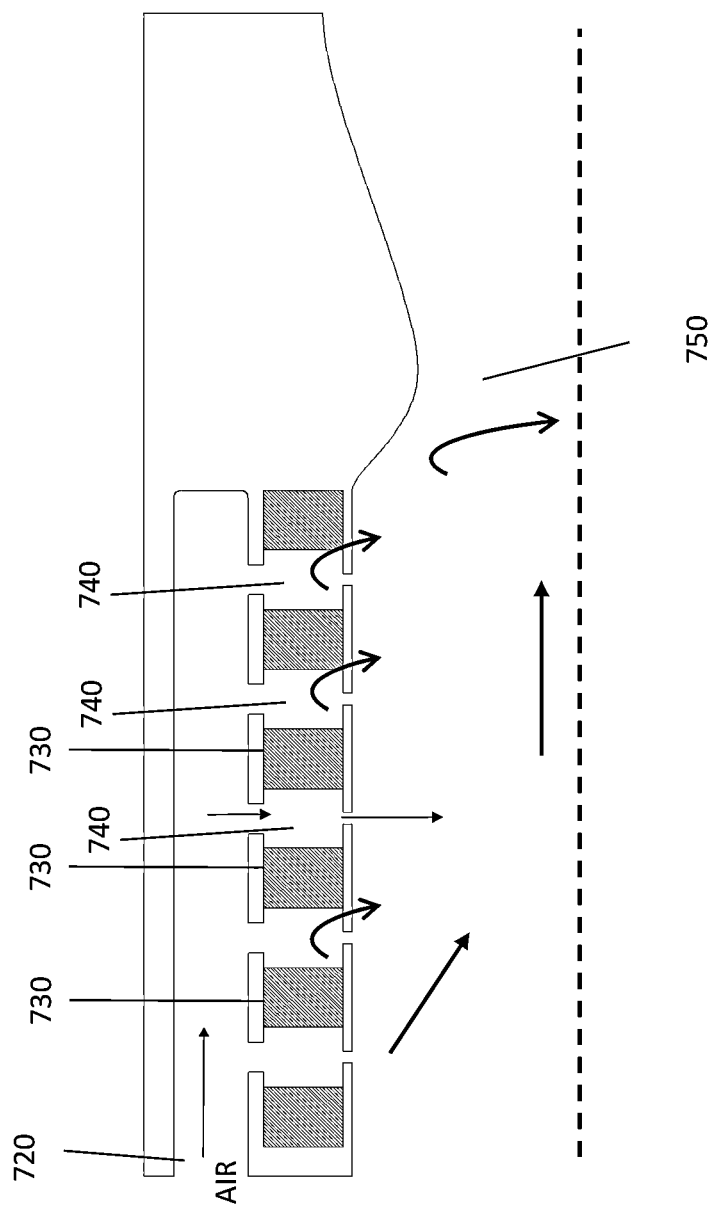
FIG. 7 is a diagram of a disc-based solid fuel rotating detonation engine, in accordance with another aspect of this disclosure.

With reference to FIGS. 6 & 7, in accordance with other aspects of this disclosure, SFRDE UNIT 600 and SFRDE UNIT 700 include a plurality of detonation chambers 640, 740, respectively, configured as rotating detonation engines. FIGS. 6 and 7 are half cross-sectional views taken longitudinally along SFRDE UNIT 600, 700, (similar to the SFRDE UNITs of FIGS. 1-5). In aspects, SFRDE UNITs 600, 700 may be substantially cylindrical (similar to the SFRDE UNITs discussed above) (or may have any other suitable shape). Each of SFRDE UNIT 600, 700 are configured to house a solid fuel 630, 730, respectively, configured to define annular chambers that are detonation chambers 640, 740. Air flows through air ducts 620, 720, and into the multiple detonation chambers 640, 740. Solid fuels 630, 730 sublimate and combust with the air in each of detonation chambers 640, 740, resulting in a rotating detonation wave of high heat product gas. The resulting RDW from each detonation chambers 640, 740 propagates towards a central shell of SFRDE UNIT 600, 700 and combines with RDWs of adjacent detonation chambers 640, 740. The high heat product gas expands as such gas exhausts out of nozzle assemblies 650, 750 thereby generating thrust. Initially, the high heat product hot gas from an RDE of one of the detonation chambers of the plurality of detonation chamber 640, 740, may ignite one or more of the other detonation chambers. In aspects, an igniter burns an upstream solid fuel 630, 730, which then combusts with the air in the forwardmost detonation chamber 640, 740. Adjacent detonation chambers are then ignited as the initial RDW created in the forwardmost detonation chamber travels downstream.

The solid fuels 630 are spaced apart and configured to define channels therebetween. In aspects, the channels may be Z-shaped (zig-zag shaped) as shown in FIG. 6. As illustrated in FIG. 7, the solid fuels 740 are configured as rings spaced apart and "stacked" adjacent one another. In, FIG. 7, the cross-section is taken along a longitudinal axis and illustrates a rectangular cross-section of the ring of the solid fuels 740. In aspects, the cross-section of the ring may be of any desirable shape, including circles or polygons. While the Z-shaped and ring-shaped solid fuels 630, 730, are shown, any solid fuel shape design may be used such that solid fuel 630, 730 is spaced apart and stacked to define rotating detonation engine detonation chambers. The SFRDE UNIT 700 includes a convergent-divergent nozzle 750 aft of solid fuel 730 and detonation chambers 740. In aspects, the nozzle assembly 750 is configured to choke the flow of the high heat hot product gas, thus accelerating the gas at it exhausts out the nozzle assembly 750.

Figure 8:
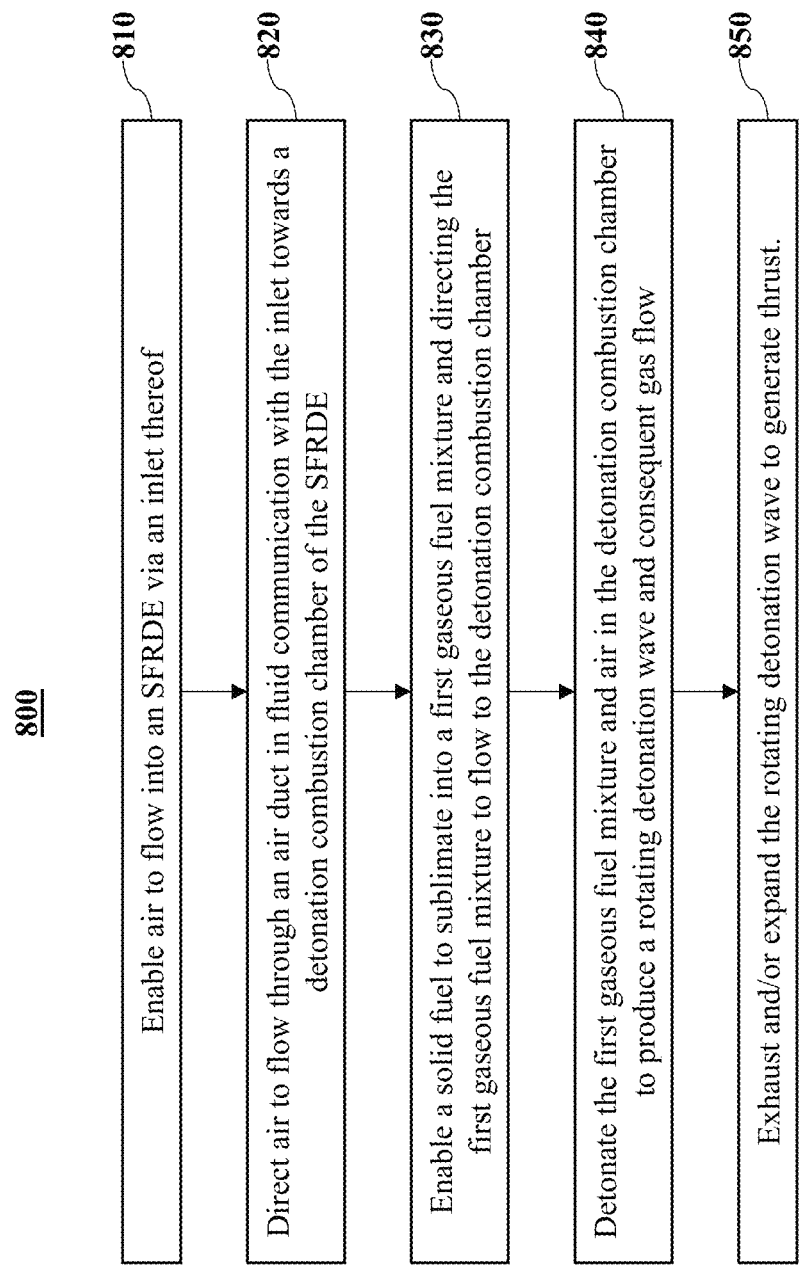
FIG. 8 is a diagram of a method for generating propulsion, in accordance with another aspect of this disclosure.

With reference to FIG. 8, a method 800 for generating propulsion, via a solid fuel rotating detonation engine of this disclosure, is shown. Operation 810 includes enabling air to flow into a solid fuel propulsion system (e.g., EB SFRDE UNIT 100, LDS SFRDE UNIT 200, SC SFRDE UNIT 300, or GG SFRDE UNIT 400, etc.) via inlet 110 thereof. Operation 820 includes directing air to flow through air duct 120 in fluid communication with inlet 110 towards detonation chamber 140. In aspects, operation 820 includes directing air to flow through the solid fuel 130 that defines the air duct 120. The air flowing therethrough is mixed with sublimated solid fuel 130 to form the first gaseous fuel mixture. Operation 830 includes enabling the solid fuel 130 to sublimate into a first gaseous fuel mixture and directing the first gaseous fuel mixture to flow to detonation chamber 140. In aspects, operation 830 includes providing a gas generator (e.g., gas generator 470, 570) configured to cause solid fuel 130 to sublimate into a first gaseous fuel mixture. In further aspects, the method includes passing the first gaseous fuel mixture over a solid fuel to cause sublimation of the solid fuel. The sublimated solid fuel is mixed with the first gaseous fuel mixture to form a second gaseous fuel mixture. In aspects, the method includes injecting the first or second gaseous fuel mixture upstream of detonation chamber 140 to mix with air flowing through the air duct to form a third gaseous fuel mixture. In further aspects, the third gaseous fuel mixture is an oxidized and enriched fuel gas mixture configured to detonate in detonation chamber 140. Operation 840 includes detonating and/or combusting the first gaseous fuel mixture and air in the detonation chamber 140 to produce a rotating detonation wave. Operation 850 includes exhausting or expanding the flow resulting from the rotating detonation wave to generate thrust. Operation 850 includes exhausting and expanding the resulting flow from the rotating detonation wave over a tapered end portion 152 of a nozzle assembly 150.

Figure 9:
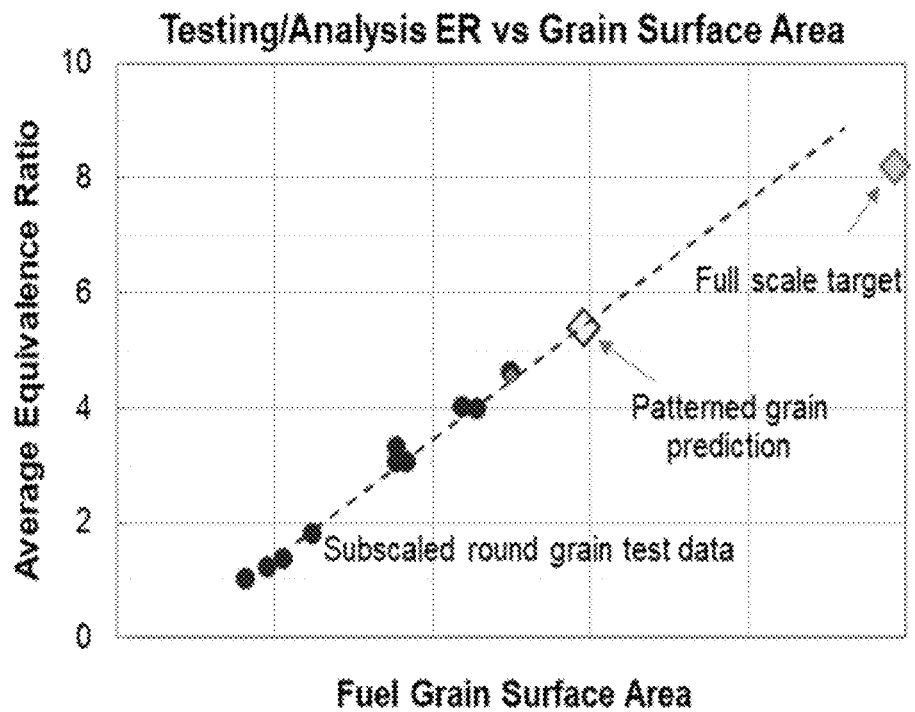
FIG. 9 is a graph of an average equivalence ratio of the staged combustion solid fuel rotating detonation engine of FIG. 3.
Figure 10:
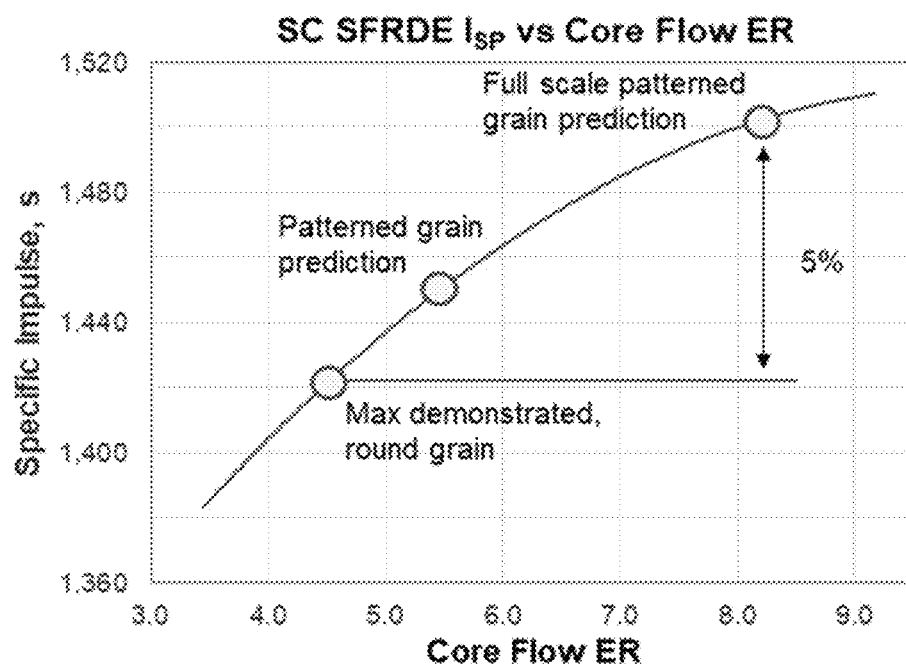
FIG. 10 is a graph of a specific impulse as a function of the equivalence ratio of the staged combustion solid fuel rotating detonation engine of FIG. 3.

With reference to FIGS. 9-10, the SFRDE UNIT enables a wider velocity operating range, or start of the combustion process, from about Mach number 0.8 to about Mach number 4. The combustion process of the SFRDE UNIT may start at lower Mach numbers (e.g., Mach 1.5 vs. Mach 2.5). This enables lower launch velocities, reduced acceleration loads versus other conventional propulsion systems, and may reduce wear on launchers or guns. The SFRDE UNIT provides a compact combustion process and improved combustion efficiency versus solid fuel ramjets (SFRJ) system. The SFRDE UNIT enables a solid fuel to be used in a combustion process versus a typical deflagration process of a solid fuel in an SFRJ system, which requires more volume for its various components. By utilizing a solid fuel for combustion in a rotating detonation engine, the SFRDE UNIT provides additional accommodation for more payload and/or fuel versus SFRJ systems. The volumetric efficiency and packaging of the solid fuel of an SFRDE UNIT enable more payload (e.g., up to about 50% more payload) and longer flight ranges (e.g., up to about 50% greater range), versus SFRJ systems. The SFRDE UNIT further improves the specific impulse, a measure of thrust per unit fuel consumption, by about 1% to about 15% versus the specific impulse of an SFRJ.

FIGS. 9 and 10 illustrate data collected from an experiment utilizing a SFRDE UNIT (such as SC SFRDE UNIT 300). In the SC SFRDE UNIT 300, the higher fuel to air equivalence ratio (ER) in the core flow, the higher fuel value of the gasified fuel supplied to the RDE combustor and higher specific impulse of the SFRDE UNIT 300. ER is a measure of the stoichiometric air to fuel ratio and an actual air to fuel ratio. FIG. 9 illustrates the ER as a function of a surface area of the solid fuel, while FIG. 10 illustrates an estimated specific impulse as a function of the ER of the core duct flow of the SC SFRDE UNIT 300. The higher the specific impulse, the better the performance of the engine and higher velocity or longer range of the aerial vehicle can be expected. An SFRDE UNIT 300 is therefore capable of either longer or faster flight or can be scaled down to provide similar flight characteristics of alternative propulsion systems, but with a greater payload due to the configuration of the SFRDE UNIT 300. The solid fuel of the SFRDE UNIT 300 allows for compact design, at least partly because it does not require the use of a flame holder as do conventional ramjet systems.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed are not to be interpreted as limiting, but as a basis for the claims and as a representative basis for teaching one skilled in the art to variously employ this disclosure in virtually any appropriately detailed structure.

The phrases "in an aspect," "in aspects," "in various aspects," "in some aspects," or "in other aspects" may each refer to one or more of the same or different aspects in accordance with this disclosure. A phrase in the form "A or B" means "(A), (B), or (A and B)." A phrase in the form "at least one of A, B, or C" means "(A); (B); (C); (A and B); (A and C); (B and C); or (A, B, and C)."

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that this disclosure is not limited to the precise aspects described, and that various other changes and modifications may be effectuated by one skilled in the art without departing from the scope or spirit of the disclosure. Additionally, the elements and features shown or described in connection with certain aspects may be combined with the elements and features of certain other aspects without departing from the scope of this disclosure, and that such modifications and variations are also included within the scope of this disclosure. Accordingly, the subject matter of this disclosure is not limited by what has been particularly shown and described.

What is claimed is:

1. A solid fuel propulsion system comprising:
    a housing including a longitudinal axis and having disposed therein:
    a housing shell extending longitudinally within the housing;
    an air inlet configured to enable air to flow into the housing;
    an air duct disposed in the housing, the air duct in fluid communication with the air inlet, the air duct configured to supply air for combustion of a gaseous fuel mixture sublimated from a solid fuel;
    a gas generator configured to cause the sublimation of the solid fuel to produce the gaseous fuel mixture;
    a rotation detonation chamber disposed in the housing aft of the air duct, the rotation detonation chamber configured to detonate the gaseous fuel mixture and air to generate a rotating detonation wave;
    a nozzle assembly configured to expand and exhaust the flow resulting from the rotating detonation wave to generate thrust; and
    the housing shell disposed in and spaced apart from the housing to define the air duct therebetween at least from a forward end of the housing shell to an aft end of the housing shell, the housing shell extending forward of the nozzle assembly;
    wherein the solid fuel has a length extending from a first end to a second end, wherein an outer surface of the housing shell partially defines the air duct at a radial height from the longitudinal axis, and wherein the radial height of the housing shell with respect to the longitudinal axis is uniform along at least a majority of the length of the solid fuel with respect to the longitudinal axis.

2. The solid fuel propulsion system of claim 1, wherein the air duct is configured to enable air to flow through a passage defined by the solid fuel.

3. The solid fuel propulsion system of claim 2, wherein the air duct enables air flowing therethrough to mix with the gaseous fuel mixture to form a fuel-rich gas that is urged into the rotation detonation chamber.

4. The solid fuel propulsion system of claim 2, further comprising a restrictor configured to restrict backflow into the air duct.

5. The solid fuel propulsion system of claim 4, wherein the restrictor is configured to enable length-distributed sublimation of the solid fuel along a length of the solid fuel.

6. The solid fuel propulsion system of claim 1, wherein the shell is configured to receive the solid fuel.

7. The solid fuel propulsion system of claim 1, wherein the air duct is defined by the space between the shell and the housing.

8. The solid fuel propulsion system of claim 1, further comprising an orifice plate disposed forward of the air duct, the orifice plate configured to direct a first portion of the air into the air duct and a second portion of the air into a bore of the shell to form a gaseous fuel mixture with sublimated solid fuel.

9. The solid fuel propulsion system of claim 8, wherein the bore is configured to receive the solid fuel, the solid fuel including a solid fuel bore configured to enable the second portion of air to flow therethrough.

10. The solid fuel propulsion system of claim 8, further comprising a fuel injector configured to inject the gaseous fuel mixture into the rotation detonation chamber.

11. A solid fuel propulsion system comprising:
a housing including a longitudinal axis and having disposed therein:
a housing shell extending longitudinally within the housing and spaced apart and coaxial with the housing to define an air duct therebetween at least from a forward end of the housing shell to an aft end of the housing shell, the housing shell configured to receive a solid propellant;
a gas generator configured to cause combustion of the solid propellant to produce a first gaseous fuel mixture; and
an air inlet in fluid communication with the air duct, the air inlet configured to enable air to flow into the housing to supply air for combustion of the first gaseous fuel mixture;
a rotation detonation chamber disposed in the housing, the rotation detonation chamber configured to combust the first gaseous fuel mixture and air to generate a rotating detonation wave;
a nozzle assembly configured to expand and exhaust the flow resulting from the rotating detonation wave to generate thrust;
wherein the housing and the nozzle assembly both terminate at a free end at a plane transverse to the longitudinal axis.

12. The solid fuel propulsion system of claim 11, wherein the nozzle assembly includes a tapered end portion extending from the housing shell, the tapered end portion defining a convergent-divergent nozzle.

13. The solid fuel propulsion system of claim 11, wherein the housing shell is configured to prevent air flowing through the air duct from directly contacting the solid propellant.

14. The solid fuel propulsion system of claim 11, further comprising a fuel injector configured to inject the first gaseous fuel mixture into an aft portion of the air duct whereby air flowing through the air duct is configured to mix with the first gaseous fuel mixture to form a second gaseous fuel mixture.

15. The solid fuel propulsion system of claim 11, further comprising a restrictor disposed about an aftmost portion of the air duct, the restrictor configured to restrict backflow from the rotation detonation chamber into the air duct.

16. The solid fuel propulsion system of claim 11, wherein the housing shell is configured to receive the solid propellant, the solid propellant being a first solid propellant, and the nozzle assembly configured to receive a second solid propellant.

17. A method for generating propulsion, the method comprising:
enabling air to flow into a solid fuel rotation detonation engine (RDE) propulsion system via an inlet thereof, the solid fuel RDE propulsion system having a housing including a longitudinal axis and a housing shell disposed within the housing, the housing shell being a forward extension of a nozzle assembly;
directing air to flow through an air duct in fluid communication with the inlet towards a rotation detonation chamber of the solid fuel RDE propulsion system, the air duct defined by a gap between the housing and the housing shell;
enabling a solid fuel to sublimate into a first gaseous fuel mixture and directing the first gaseous fuel mixture to flow to the rotation detonation chamber;
detonating the first gaseous fuel mixture and air in the rotation detonation chamber to produce a rotating detonation wave; and
exhausting and expanding the rotating detonation wave to generate thrust;
wherein the solid fuel has a length extending from a first end to a second end, wherein an outer surface of the housing shell partially defines the air duct at a radial height from the longitudinal axis, and wherein the radial height of the housing shell with respect to the longitudinal axis is uniform along at least a majority of the length of the solid fuel with respect to the longitudinal axis.

18. The method of claim 17, wherein directing air to flow through an air duct includes directing air to flow through the solid fuel whereby the air flowing therethrough mixes with sublimated solid fuel to form the first gaseous fuel mixture.

19. The method of claim 17, further comprising: causing the solid fuel to sublimate into the first gaseous fuel mixture with a gas generator.

20. A method for generating propulsion, the method comprising:
enabling air to flow into a solid fuel rotation detonation engine (RDE) propulsion system via an inlet thereof, the solid fuel RDE propulsion system having a housing including a longitudinal axis and a housing shell disposed within the housing, the housing shell being a forward extension of a nozzle assembly;
directing air to flow through an air duct in fluid communication with the inlet towards a rotation detonation chamber of the solid fuel RDE propulsion system, the air duct defined by a gap between the housing and the housing shell;
enabling a solid fuel to sublimate into a first gaseous fuel mixture and directing the first gaseous fuel mixture to flow to the rotation detonation chamber;
detonating the first gaseous fuel mixture and air in the rotation detonation chamber to produce a rotating detonation wave; and
exhausting and expanding the rotating detonation wave to generate thrust;
wherein the housing and the nozzle assembly both terminate at a free end at a plane transverse to the longitudinal axis.

* * * * *